United States Patent [19]

Ward

[11] Patent Number: 4,848,399

[45] Date of Patent: Jul. 18, 1989

[54] FIRST OUT PNEUMATIC INDICATOR VALVE

[76] Inventor: Earl P. Ward, 3817 Lake Des Allemands Dr., Harvey, La. 70058

[21] Appl. No.: 200,554

[22] Filed: May 31, 1988

[51] Int. Cl.⁴ .............................................. F16K 37/00
[52] U.S. Cl. ............................... 137/557; 137/625.66; 137/552
[58] Field of Search .................. 137/552, 557, 625.66, 137/551; 116/269, 271, 277

[56] References Cited

U.S. PATENT DOCUMENTS

| | | | |
|---|---|---|---|
| 4,121,615 | 10/1978 | Bergeron | 137/557 |
| 4,442,860 | 4/1984 | Taylor | 137/557 |
| 4,470,367 | 9/1984 | Bergeron | 137/557 |
| 4,559,970 | 12/1985 | Taylor et al. | 137/557 |
| 4,660,600 | 4/1987 | Bergeron | 137/552 |

Primary Examiner—A. Michael Chambers
Attorney, Agent, or Firm—Pravel, Gambrell, Hewitt, Kimball & Krieger

[57] ABSTRACT

The apparatus of the present invention relates to a first out indicator valve having a main body portion, with a flow bore longitudinally through the body; an inlet port, an exhaust port through the walls of the body and fluid communication with the longitudinal flow bore; a pilot port of the lower portion of the valve in fluid communication with the longitudinal bore, and a stem movable within the longitudinal bore from a first position blocking fluid communication between the inlet and exhaust port and a second position allowing communication between the inlet and exhaust ports.

11 Claims, 2 Drawing Sheets

FIRST OUT PNEUMATIC INDICATOR VALVE

BACKGROUND OF THE INVENTION

1. Field of the Invention

The apparatus of the present invention relates to valves. More particularly, the present invention relates to a valve which would function as a first out indicator in a system monitoring a number of functions in producing oil and gas wells.

2. General Background

In a producing gas or oil well, it is required that a number of functions which are occurring in the production of gas or oil through the system be monitored so that in the event a malfunction occurs, the precise malfunction can be located, and remedied. There are numerous types of monitors utilized in order to achieve this, one of these monitors, as known in the art, are deemed first out indicators. A first out indicator is normally a pneumatic device which is kept in an open position for allowing gas under pressure to flow through the indicator during operation of the system. The valve is maintained open by pilot pressure, usually on the base of the valve, which is pressurized within a certain range of pressure. Alternately, the device may be of the parallel logic design in which case pilot pressure will maintain the valve in an "in service" position with the system or inlet pressure blocked from the exhaust port, maintaining the system pressure. If the pilot pressure is reduced below the appropriate range, due to a malfunction, the first out indicator will move to the vent position, and that particular system will be shut in. Since the shut in of the production process may produce conditions which would indicate other malfunctions, the first out indicator would indicate that malfunction which had occurred first, prior to the system shut in. This provides information which may be used to remedy the situation which caused the first malfunction and system shut in.

The following patents are noted as being pertinent to the present state of the art:

U.S. Pat. No. 4,660,600 issued to Bergeron, entitled "First Out Indicator" teaches the use of a first out indicator which uses a primary valving means in the valve body for establishing communication between a first fluid inlet and an exhaust means when the valving means is in a first position and blocking the fluid flow when the valve means is in the second or closed position. When the second fluid inlet is pressurized, the fluid from the first fluid inlet causes the valve means to move from the first to the second position. There is also included means which prevents the first valve from moving from the first to the second position which would include a second fluid exhaust means in the housing and means for blocking communication between the first fluid inlet and the second fluid exhaust when the second inlet is pressurized.

U.S. Pat. No. 4,561,464 issued to France, entitled "Relay Valve" provides a relay valve having inlet, outlet and exhaust ports and a gas actuated valving constructed so as to close the exhaust port before the opening of the inlet point.

U.S. Pat. No. 3,901,267 issued to Moon entitled "Relay Construction and Method of Making the Same" which provides a singular relay construction for providing the function of a normally closed relay, a normally opened relay, and a diverting relay so that the single relay construction can be utilized to function selectively as a normally closed relay, as a normally open relay, and as a normally diverting relay.

U.S. Pat. No. 4,559,970 issued to Taylor entitled "Patent Control Relay Valve Apparatus" relates to a pilot relay control valve with a visual indicator. The valve having a main body with a bore extending through the valve having a main slide valve. One end portion extending from the main body to a secondary housing by providing a protectable cover and a means for manually moving the slide valve to a displaced position for setting the controls required in the system.

U.S. Pat. No. Re. 31,845 issued to Peters entitled "Relay Valve for Fluid Actuators" relates to a relay valve having an inlet, outlet, and a pilot pressure port for normally maintaining the valve in the open position. The valve also includes an indicator on the top portion of the valve, which is part of the stem and moves in conjunction with the stem as the stem moves from the open to the close position indicating green and red respectively in the indicator portion of the valve.

U.S. Pat. No. 3,139,902 issued to Thomas;
U.S. Pat. No. 3,129,722 issued to Wagner;
U.S. Pat. No. 3,001,541 issued to St. Claire;

Further patents which are representative of the patents found in the art.

SUMMARY OF THE PRESENT INVENTION

The apparatus of the present invention relates to a first out indicator valve having a main body portion, with a flow bore longitudinally through the body; an inlet port, an exhaust port through the walls of the body, each in fluid communication with the longitudinal flow bore; a pilot port at the lower portion of the valve in fluid communication with the longitudinal bore, and a stem movable within the longitudinal bore from a first position blocking fluid communication between the inlet and exhaust ports and a second position allowing communication between the inlet and exhaust ports.

There is further provided a piston member on the lower portion of the stem for receiving fluid pressure from the pilot port and shifting the stem from the first open position to a second closed position.

Further, there is provided an indicator sleeve moveable within an annular space of the flow of the longitudinal flow bore between the wall of the body portion and the stem, which moves to the up position when receiving fluid pressure from the inlet port and is mechanically moved to the down position when the stem member moves to the down position. The top portion of the valve includes an indicator cap for indicating whether the valve is in the in service or the shut in position.

Therefore, it is the primary object of the present invention to provide a first out indicator valve which indicates a first out in a multiple line system through an indicator portion within the valve body;

It is a further object of the present invention to provide a first out indicator valve which includes an indicator portion upwardly moveable in response to fluid pressure, and moveable to a down position in response to a mechanical engagement with a stem moving to the down position;

It is still a further object of the present invention to provide a first out indicator valve which indicates a first out in a system comprising a plurality of indicators, by movement of an indicator within the valve, the indicator moveable in response to fluid pressure or mechanical engagement with a portion of the valve.

These and other objects of this invention will be readily apparent to those skilled in the art from the detailed description and claims which follow.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 5:
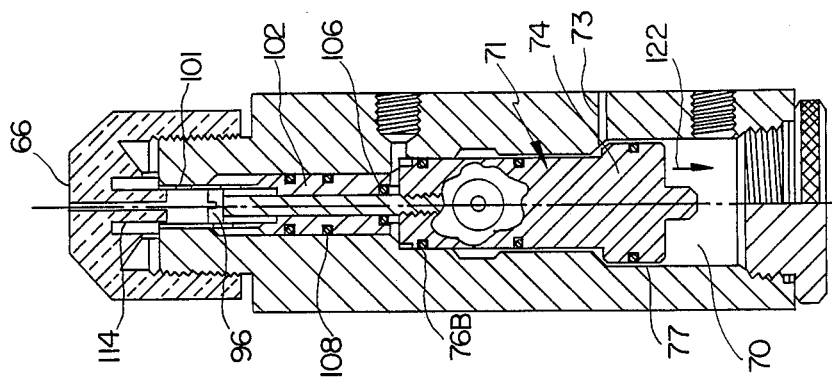
FIG. 5 illustrates a side view of the valve in a position illustrating the piston member in the up position, the indicator member in the down position.
Figure 6:
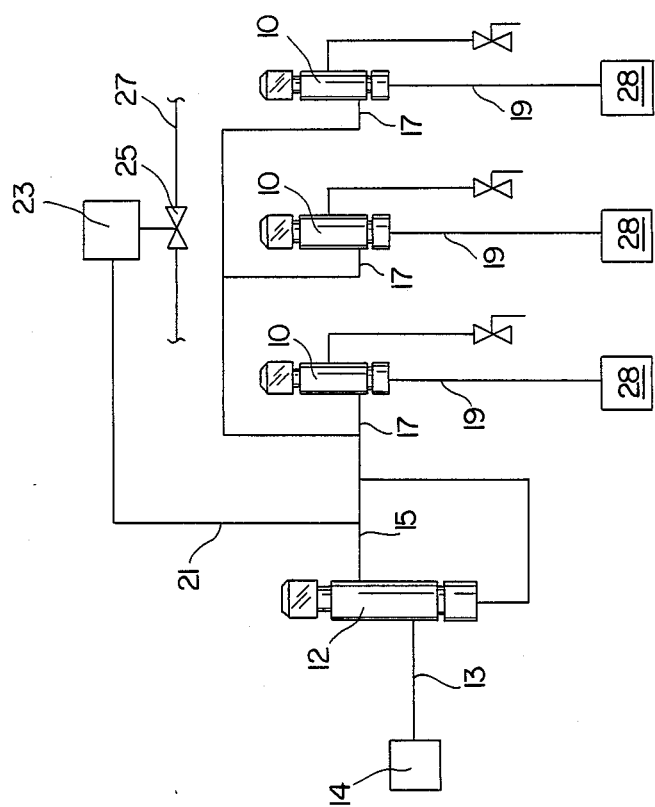
FIG. 6 illustrates a schematic of the control panel in which the valve of the present invention is utilized.

FIGS. 1-6 illustrate the preferred embodiment of the system of the present invention. Turning first to FIG. 6 discussion shall be had of the type of system that the first out indicator 10 would operate. As seen in the FIGURE, there is illustrated a plurality of indicators 10 of the present invention which are connected in parallel relationship to a master relay 12. The master relay 12 would not necessarily form part of the present invention, as it is presently known in the art in its function. The master relay 12 would receive fluid under pressure, of a pneumatic sort, from a supply source 14, through line 13 and would in essence provide the fluid pressure to each indicator 10 through line 15 and parallel lines 17 which would flow into an inlet port in valve 10. In each case the supply fluid would provide the respective indicator through the inlet port. This supply fluid would act on the internal components of the relay 10 and be blocked from exhaust in the event that fluid pressure within a designated range would be supplying the pilot port on the base of valve 10 via line 19. Such a supply of fluid pressure through the base would shift the valve to the in service position. In the schematic, the pilot pressure enters the relay 10 at its base, through line 19, as seen further in the schematic a line 21 branches off of line 15 to feed a shut down valve 23 and would retain, for example, a gate valve 25 in the open position so that oil may flow in production line 27. Assuming a malfunction is detected by one of the sensors 28, the fluid supplying the pilot port on the base of the valve would be vented causing the indicator to be shifted to the shut in position by internal fluid pressure supplied at the inlet portion of valve 10.

Figure 1:
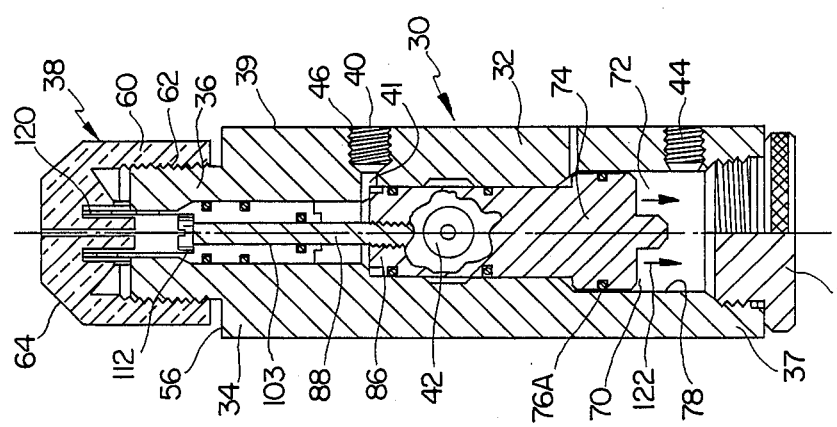
FIG. 1 illustrates a cross sectional view of the preferred embodiment of the first out indicator valve in the in service position.
Figures 2, 4:
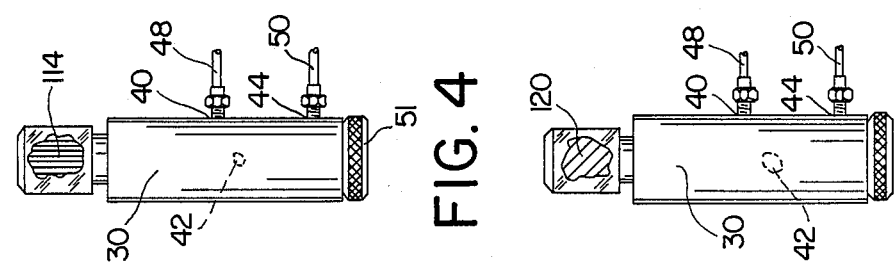
FIG. 2 provides a side view of the valve in the in service position, and further illustrates the color indicated on the indicator portion of the valve.
FIG. 4 illustrates a side view of the valve in the shut in position, further illustrating in cutaway view the color of the indicator portion.

Turning now to the actual construction of the first out indicator, reference is made to FIGS. 1-5. As seen in FIG. 1, the first out indicator valve is illustrated by the numeral 30. Valve 30 would be generally cylindrical in shape having a lower body portion 32, an upper body portion 34, an upper throat portion 36 and a cap portion 38. Generally, valve 30 would be cylindrical in shape having a continuous sidewall 39, sidewall 39 having a fluid inlet opening 40, a fluid exhaust or vent port 42, and a pilot port 44 for receiving fluid under pressure. For purposes of structure each of the ports 40, 42, 44, include a threaded sidewall 46 for threadably engaging into an inlet fluid line 48 and exhaust vent line 49 and a pilot fluid line 50 as seen in FIGS. 2 and 4.

As seen in the FIGURES, the lower end portion 37 of valve 30 includes a base member 51 which is threadably attached to a lower end portion 37 for attachment thereto. As seen in the FIGURES, first shoulder 56 is formed by the junction of the neck portion 36 and the upper body portion 34.

For purposes of structure, cap portion 38 would comprise a substantially circular cap member having a wall portion 60 threadably engaged via threads 62 to the upper section of neck portion 36, the cap portion having a continuous upper bevelled face 64 and a flat top surface 66. As the valve moves between in service and shut in position, the translucent nature of cap portion 38 enables one to view the collar along the upper stem member of the valve for indicating whether or not the valve is open or shut closed. The nature of the material of cap portion 38 would allow viewing of the position of the stem member from a 360° range around cap portion 38 or directly viewed from the top 66 of cap 38.

Turning now to the internal structure of valve 30, valve 30 would include a continuous longitudinal flow bore 70 extending from the lower base portion 37 through the length of the valve. A valve stem 71 extends through bore 70, and includes several components. Bore 70 enlarges in its lower portion to counter bore 72 for housing the lower end of stem 71, a piston member 74. Piston member 74 includes a first O ring 76A positioned along its annular sidewall 77 for achieving a fluid tight seal between the inner wall 78 of the counter bore 72 and the outermost wall 77 of piston member 74, so that pilot fluid does not flow from below the O ring 76A to that portion above O ring 76A and pressure is maintained during operation.

As seen further, counter bore 72 extends to a slightly reduced bore 82, housing the upper portion 84 of piston 74. Again the wall 77 of upper portion 84 provides an O ring 76B for blocking any inlet fluid flow past O ring 76B during operation. As seen further, piston 74 has an upper portion 86 which is threadably engaged to an upper stem member 88, with stem member extending along the upper cylinder bore 90 within the valve body 30. Stem 88 engages a collar member 102 which extends within bore 90 and moves between up and down positions as will be described further. Stem member 88, extending upward through bore 90, terminates at a flat upper head portion 96, being of broader diameter than stem member 88.

Housed within the annular space between the wall 92 of bore 90 and stem member 88 is collar 102 which serves as a means for indicating whether the valve is in the in service or shut in positions, relative to the movement of stem member 88 and piston 74 moving between up and down positions. This means includes extended collar member 100 which is formed by a continuous sidewall 101 and an internal bore 104 which allows movement of collar 102 upward and downward while stem member is riding within bore 104 at the upper end of collar 102, indicator member 101 serves to indicate the in or out of service positions of the valve. In the wall of collar 102 there is located three O rings 106 and 108 and 108B respectively. O rings 108 and 108B seal the annular space between the wall 92 of bore 90 and the outer wall 101 of collar 102. Likewise, inner O ring 106 would fluidly seal that space between the inner wall 103 of collar 100 and outer wall 91 of stem member 88.

Bore 104 within collar 102 would form an upper counter bore 110 at its upper portion, defined by a shoulder portion 112, onto which the lower face of head 96 would rest when stem member 88 is in the lowered position. Counter bore 110 would be slightly larger in diameter to the diameter of cap member 96 for allowing the travel of cap member 96 within counter bore 110 as stem member 86 moves in relation to collar member 100.

During operation of the valve, pilot pressure within a certain range through port 44 would provide force on the lower face 73 of piston 74. Due to the position of O ring 76A blocking any travel of fluid between the wall 78 of valve 30 and the wall 77 and piston 74, causing piston 74 to shift to the up position as seen in FIG. 1. However, at that time even with pilot pressure having shifted piston 74 to the up position, the collar member 102 will not have necessarily shifted upward since stem member 88 could travel upward within the annular housing the annular space 110 of collar member 102 without shifting collar 102. (See FIG. 5) Therefore collar 102 would be maintained in the down position, indicating the color red on the indicator cap 38. However, in order to put the valve in service, an inlet control pressure would be provided to port 40. With the valve shifted to the up position, by pilot pressure at port 44, fluid entering bore 90 through port 41, would force the collar member 102 to the up position as seen in FIG. 1, and the valve would be in service.

It should be noted, as fluid is introduced into port 40, while valve stem 71 is shifted to the up position by fluid pressure through port 44, upper O ring 76B in the wall 74 of upper piston 84 seals any fluid from flowing past O ring 76B. O rings 106 and 108A and 108B in the wall of collar 102 likewise blocks fluid pressure from flowing past O rings 106 and 108A and 108B, and therefore shift collar 102 to the up position whereby the green indicator sleeve 120 on collar 102 would shield the red portion 114 of cap member 38, and therefore the valve would indicate green in the in service and operating positions (FIG. 2). It is through the continuing fluid pressure in bore 90 from bore 40 which maintains the valve stem 102 in the up position during functioning of the valve.

Figure 3:
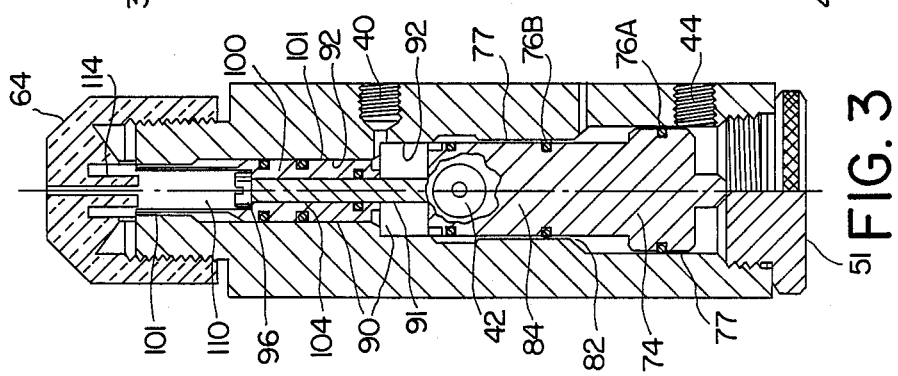
FIG. 3 illustrates a cross sectional view of the preferred embodiment of the indicator valve of the present invention in the vent or shut in position.

In the event that fluid pilot pressure is lost within port 44 due for example, venting at a remote source, pilot pressure would be lost against piston 74, the fluid contained within bore 90 would create force downwardly on piston 74 in the direction of arrows 122, (FIG. 1) and shift the piston 74 downward since there is no longer pilot pressure through port 44. At that point, since the piston is moving downward, stem member 88 since it is threadably engaged into piston 74, would move downward. Since the head portion 96 is resting upon shoulders 112 of collar 102, the head portion 96 would likewise force collar 108 to move with a downward movement of piston 74. By doing so, piston 74 is shifted to the down position as seen in FIG. 3, and has moved collar member 102 down, so that green shield 120 no longer shields red zone 114, and therefore the indicator shows red or out of service (FIG. 4). In addition, since while in the in service position the position of O ring 76A blocked any fluid communication between inlet 40 and vent port 42, when the piston 74 shifted downward by fluid pressure in bore 90, O ring 76 moves past shoulder 83 between counter bore 72 and upper bore 74. Therefore fluid is allowed to flow from the inlet port 40 out exhaust port 42 as seen in FIG. 3.

FIG. 5 illustrates the condition of the valve 30, when pilot pressure has been introduced into the pilot port 44, and has shifted the piston member 74 from the second down position to the first up position as seen in FIG. 5. In this condition, there has been no introduction of inlet fluid into the inlet port 40, therefore collar 102 has not likewise shifted to this first up position. Therefore, the valve is still "out of service" according to the indicator, and therefore the system is shut in. Upon returning the system to normal, fluid inlet pressure would then be introduced into the inlet port, and the collar would then shift to the up position as seen in FIG. 1, and the system having been returned to service. Therefore, as illustrated, collar 102 works independently of the piston member 74 piston member 74 is shifted upward by the return of pilot pressure. This is important, so that the indicator member 101 of collar 102 would not indicate an in service or "green" position as seen in FIG. 2, until such time as inlet pressure has been returned to the system through the inlet port 40.

Of course, when the malfunction is corrected, pilot pressure if again introduced into lower port 44, and the pressure again forces piston member 74 to the up position as seen in FIG. 1, so that now supply fluid may be introduced into inlet port 40, in order to force collar 102 to the up position and show that the valve is in the operating mode. It is through this novel arrangement of the inter-mechanical operation between the piston 74 and the indicators collar 102 that the valve achieves functioning as a first out indicator unlike other valves presently in the art.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A first out indicator valve, comprising:
   (a) a valve housing having a first fluid inlet port, a second fluid exhaust port, a pilot port, and a bore substantially along the length of the valve body, in fluid communication with the first inlet port, exhaust port, and pilot port;
   (b) valving means movable in the bore so that in a first position fluid communication is blocked between the fluid inlet port and the exhaust port, and in a second position fluid flow is allowed between the fluid inlet port and the fluid exhaust port;
   (c) an indicator member, likewise moveable within the longitudinal bore, the indicator member moveable to the up position upon the introduction of fluid into the inlet port, and movable to the second position upon loss of fluid pressure in a pilot port; and
   (d) means for allowing the indicator member to remain in the second position while the piston moves to the first position in response to pressure from the pilot port, but providing that the indicator member be moved to the first position through introduction of fluid into the inlet port.

2. The valve in claim 1 means for providing that the indicator may be moved to the second position in response to the piston moving to the second position.

3. The valve in claim 1, wherein the means for allowing the indicator member to remain in the down position while the piston moves to the up position comprises a separate collar member movable upwardly through fluid pressure from the first fluid inlet port, and moveable downwardly through mechanical engagement by an upper portion of the piston member.

4. The valve in claim 1, wherein there is further included a transparent cap member on the top portion of the valve for indicating the colors red or green depending on the status of the valve.

5. The valve of claim 1, wherein the indicator member moves from the second position to the first position only in response to fluid pressure from the inlet port.

6. An indicator valve, comprising:
(a) a valve housing having a first fluid inlet port, a second fluid exhaust port, a fluid pilot port, and a bore substantially along the length of the valve body, the bore in fluid communication with the inlet port, exhaust port, and pilot port;
(b) a piston, movable to a first position within the valve bore, in response to fluid pressure from the pilot port;
(c) means on the piston member for blocking fluid flow between the inlet port and exhaust port, when piston is in the first position, and allowing fluid flow between the inlet port and the outlet port when the piston is in a second position;
(d) an indicator member also housed within the bore, and movable to a first position in response to fluid pressure from the inlet port, but unresponsive to movement by the piston, when the piston is moved from the second position to the first position by pressure from the pilot port and no fluid pressure from the inlet port; and
(e) means positioned on the piston, for engaging the indicator member when the indicator member and the piston are in first positions, and moving the indicator member to the second position when the piston moves to the second position.

7. The valve in claim 6, wherein the indicator member would remain in the second position, although the piston member would move to the first position in response to fluid pressure from the pilot port.

8. The valve of claim 6, further comprising means for maintaining the piston member and indicator member in the first position during fluid loss from the pilot port and the inlet port.

9. An indicator valve comprising:
(a) a valve housing being the first fluid inlet port, and second fluid exhaust port, a fluid pilot port, and a bore substantially along the length of the valve body, the bore in fluid communication with the inlet port, the exhaust port, and the pilot port;
(b) a piston movable within the valve bore, in response to fluid pressure from the pilot port or the inlet port;
(c) means on the piston member for blocking fluid communication between the inlet port and the exhaust port, when the piston is in a first up position, but allowing fluid flow between the inlet port and the exhaust port when the piston is in a second down position;
(d) an indicator member housed within the bore, and movable upward in response to fluid pressure from the inlet port, when the piston member is in the first up position, but unresponsive to fluid inlet pressure when the piston is in the second down position; and
(e) means, associated with the piston member, for mechanically engaging the indicator member, so that when the indicator member and the piston are in the first up position, in response to fluid inlet pressure and pilot pressure, upon loss of pilot pressure, the movement of the piston to the second down position would impart movement of the indicator member to the second down position, indicating an out of service condition of the valve.

10. The valve in claim 9, wherein although the piston member would return to the first up position through pressure into the pilot port, the indicator member would be maintained in the second down position.

11. The valve in claim 10 wherein the indicator member would move to the first up position only in response to fluid pressure into the fluid inlet port.

* * * * *